US008417629B1

(12) United States Patent
Hildebrand et al.

(10) Patent No.: US 8,417,629 B1
(45) Date of Patent: Apr. 9, 2013

(54) SYSTEMS AND METHODS FOR REMOTE DEPOSIT SERVICE

(75) Inventors: Marc Hildebrand, San Antonio, TX (US); Jeff Easley, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 134 days.

(21) Appl. No.: 12/182,225

(22) Filed: Jul. 30, 2008

(51) Int. Cl.
*G06Q 40/00* (2012.01)
(52) U.S. Cl. .......................... 705/39; 705/35
(58) Field of Classification Search ............ 705/35
See application file for complete search history.

(56) References Cited

U.S. PATENT DOCUMENTS

| 5,644,724 | A | 7/1997 | Cretzler | |
|---|---|---|---|---|
| 7,876,949 | B1 * | 1/2011 | Oakes et al. | 382/137 |
| 7,917,415 | B1 * | 3/2011 | Petruzzi | 705/35 |
| 2003/0050889 | A1 * | 3/2003 | Burke | 705/40 |
| 2004/0039701 | A1 * | 2/2004 | Nakamura et al. | 705/42 |
| 2005/0267843 | A1 * | 12/2005 | Acharya et al. | 705/42 |
| 2005/0283436 | A1 | 12/2005 | Greer et al. | |
| 2008/0023539 | A1 * | 1/2008 | Rao et al. | 235/379 |
| 2008/0059376 | A1 | 3/2008 | Davis et al. | |

FOREIGN PATENT DOCUMENTS

EP 984410 A1 * 3/2000

OTHER PUBLICATIONS http://web.archive.org/web/20060522170454/http://whatis.techtarget.com/definition/0,,sid9_gci774854,00.html.*
Banks hope to draw deposits to ATMs; [FINAL Edition] Christine Dugas. USA TODAY (pre-1997 Fulltext). McLean, Va.: May 10, 1996. p. 04.B.*
U http://web.archive.org/web/20060522170454/http://whatis.techtarget.com/definition/0,,sid9_gci774854,00.html.*
http://web.archive.org/web/20060522170454/http://whatis.techtarget.com/definition/0,,sid9_gci774854,00.html.*
Banks hope to draw deposits to ATMs; [FINAL Edition] Christine Dugas. USA TODAY (pre-1997 Fulltext). McLean, Va.: May.*
Cheque it out Andrew Wahl. Canadian Business. Toronto: Winter 2006/2007. vol. 79, Iss. 24; p. 23, 1 pgs.*
Wal-Mart case exposes flaws in banking commerce split Peter Wallison American Banker, New York, NY Jan. 11, 2002.*
K. Oberg, What benefits have been delivered in practice by remote deposit and how do you maximize them?, Journal of Payments Strategy & Systems, Jul. 2007, [Retrieved on May 15, 2008], Link to the document <http://henrystewart.metapress.com/app/home/contribution.asp?referrer=parent&backto=issue,6,8;journa1,4,7; linkingpublicationresults,1:120196,1>.

* cited by examiner

*Primary Examiner* — William Rankins
(74) *Attorney, Agent, or Firm* — Perkins Coie LLP

(57) ABSTRACT

A system, method, and computer-usable medium are disclosed for the remote deposit of funds into a financial account from a point of purchase (POP) terminal. Funds are received from an account holder for remote deposit. Checks are scanned and a check image transaction is originated by the POP terminal to deposit the funds value of one or more checks into one or more financial accounts associated with the account holder. Cash funds are received and a debit transaction is originated to transfer the funds value of the cash from an account of a financial institution associated with the POP terminal into a financial account associated with the account holder. The POP terminal receives acknowledgment from the account holder's financial institution of the receipt of the deposits. The account holder is then provided the acknowledgement.

23 Claims, 7 Drawing Sheets

SYSTEMS AND METHODS FOR REMOTE DEPOSIT SERVICE

CROSS REFERENCE TO RELATED APPLICATIONS

U.S. patent application Ser. No. 12/182,213, entitled "Systems and Methods for Remote Deposit Service," inventors Marc Hildebrand and Jeff Easley, filed on Jul. 30, 2008, describes exemplary methods and systems and is incorporated by reference in its entirety.

BACKGROUND

1. Field of the Disclosure

Embodiments of the disclosure relate in general to the field of computers and similar technologies, and in particular to software utilized in this field. Still more particularly, it provides a system, method, and computer-usable medium for remote deposit of funds into a financial account from a point of purchase terminal.

2. Description of the Related Art

Banking customers often choose a bank out of convenience. For example, a bank with a local branch may be chosen even though the customer may prefer a relationship with a different bank that may not be conveniently located. In general, the convenience factor relates to making deposits rather than withdrawals or other services. Today, automated teller machines (ATMs) are ubiquitous and their associated networks allow access to practically any financial institution. While the interconnection of these ATMs makes it convenient to make a withdrawal and balance inquiries, deposits can only be made to ATMs that are operated by the customer's financial institution. Even when such deposits are made, the financial value they represent is unavailable for use by the bank customer until they are physically collected and processed.

Currently, there are a large number of merchants (e.g., food and convenience stores, etc.) that accept funds for the payment of bills (e.g., utilities, etc.) on behalf of their customers. In some cases, these payments are made by accessing the afore-mentioned ATM networks from an employee-operated point of sale (POS) terminal. In other cases, a customer's check is scanned and the resulting digitized image is used to originate a transfer of payment directly from the customer's bank account to the bank account of the payee.

However, merchants that currently accept cash and checks for walk-in payments are unable to accept deposits on behalf of a bank's customers. In view of the foregoing, there is a need to adapt the existing walk-in payment infrastructure to accommodate cash and check deposits into checking, savings, 529, 401K, mutual fund, brokerage, and other financial accounts. Furthermore, the bank customer's account should be credited almost immediately if the deposit is cash. In addition, there is a need to perform real-time account validation to ensure that both the financial account the check is drawn upon and the financial account receiving the deposit is valid.

BRIEF SUMMARY

A system, method, and computer-usable medium are disclosed for the remote deposit of funds into a financial account from a point of purchase (POP) terminal. In various embodiments, funds such as cash and checks are received from an account holder for remote deposit from a POP terminal into one or more financial accounts associated with the account holder. As used herein, a POP terminal refers to any combination of computing and communications functionality operable to process a financial transaction over a network connection with a remote financial institution. In various embodiments, these remote financial institutions include the account holder's financial institution, the financial institution a check is drawn upon, and a financial institution associated with a POP terminal. In one embodiment, a transaction for the deposit of funds is processed by a clearinghouse. In another embodiment, origination of a deposit transaction results in the funds being transferred directly from a first financial institution into a second financial institution.

In various embodiments the POP terminal comprises a remote deposit module operable to process transactions with a plurality of financial institutions and clearinghouses. In one embodiment, checks are scanned by a check scanner to capture information relating to the issuing financial institution, such as the financial institution bank identification number (BIN), routing information, branch identification, and the financial account the check is drawn upon. In another embodiment, the check scanner comprises a magnetic ink reader operable to read and decode magnetic ink character recognition (MICR) data that is imprinted on the check. In one embodiment, the scanned information relating to the financial institution that issued or backs the check is validated.

In one embodiment, a check image transaction is originated by the POP terminal to deposit the funds value of one or more checks into one of the account holder's financial accounts. In another embodiment, multiple checks drawn on different issuing financial institutions are deposited in a single financial account. In yet another embodiment, the deposit of the funds value of one or more checks is split across multiple financial accounts. In one embodiment, a check image transaction is originated to deposit the funds value of one or more checks into an account of a financial institution associated with the point of purchase. One or more debit transactions are then originated to transfer proportionate amounts of the funds value of the check(s) into multiple financial accounts associated with the account holder. In another embodiment, cash funds are received and a debit transaction is originated to transfer the funds value of the cash from an account of a financial institution associated with the POP terminal into a financial account associated with the account holder. In these and other embodiments, the POP terminal receives acknowledgment of the receipt of the deposits from the account holder's financial institution. The account holder is then provided acknowledgement of the receipt of the deposits into the account holder's financial account(s).

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
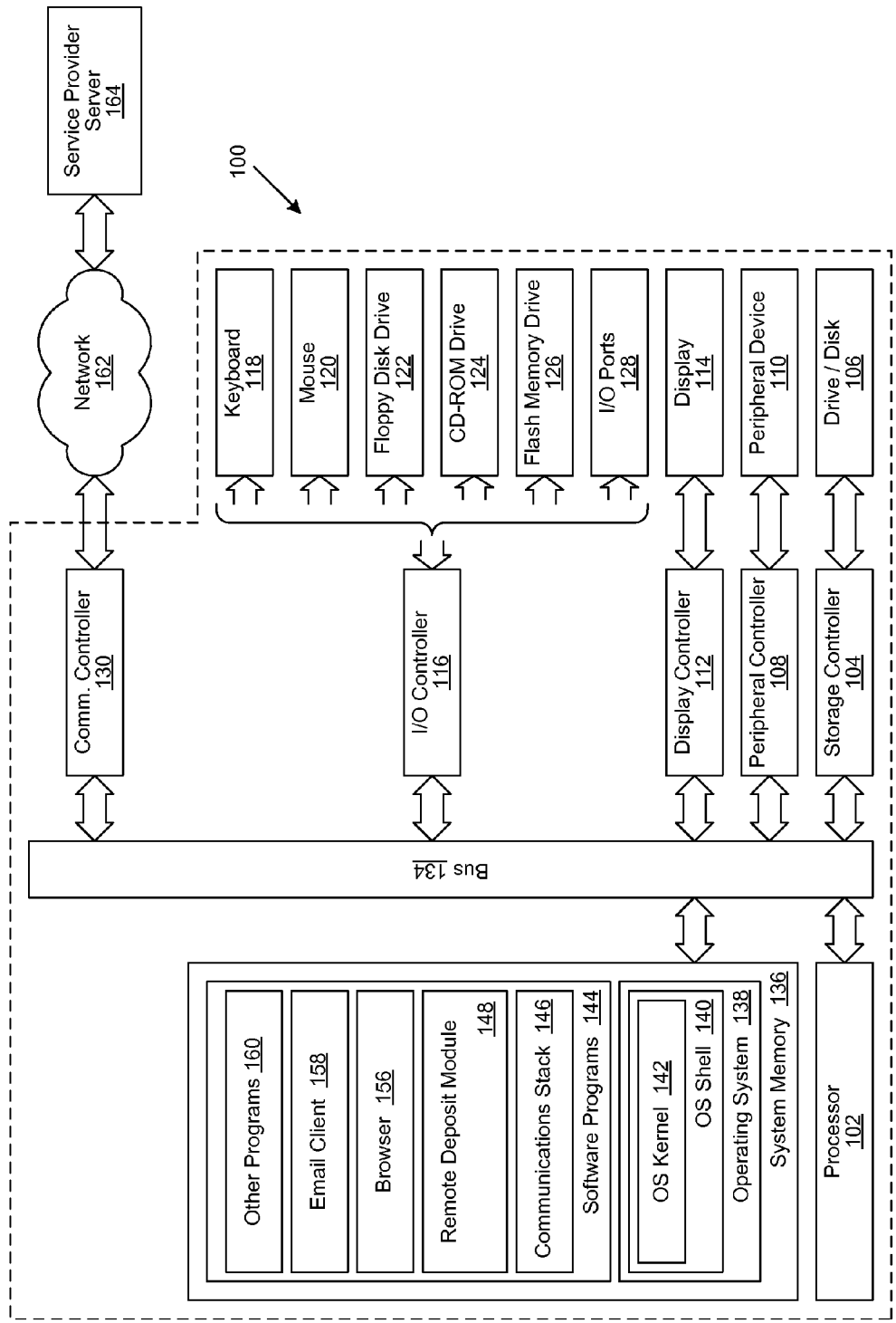
FIG. 1 depicts an exemplary client information processing system (IPS) in which embodiments of the disclosure may be implemented.

A method, system and computer-usable medium are disclosed for the remote deposit of funds into a financial account from a point of purchase terminal. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a remote deposit module 148. The remote deposit module 148 includes code for implementing the processes described in FIGS. 2-3 described hereinbelow. In one embodiment, client IPS 100 is able to download the remote deposit module 148 from a service provider server 164.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
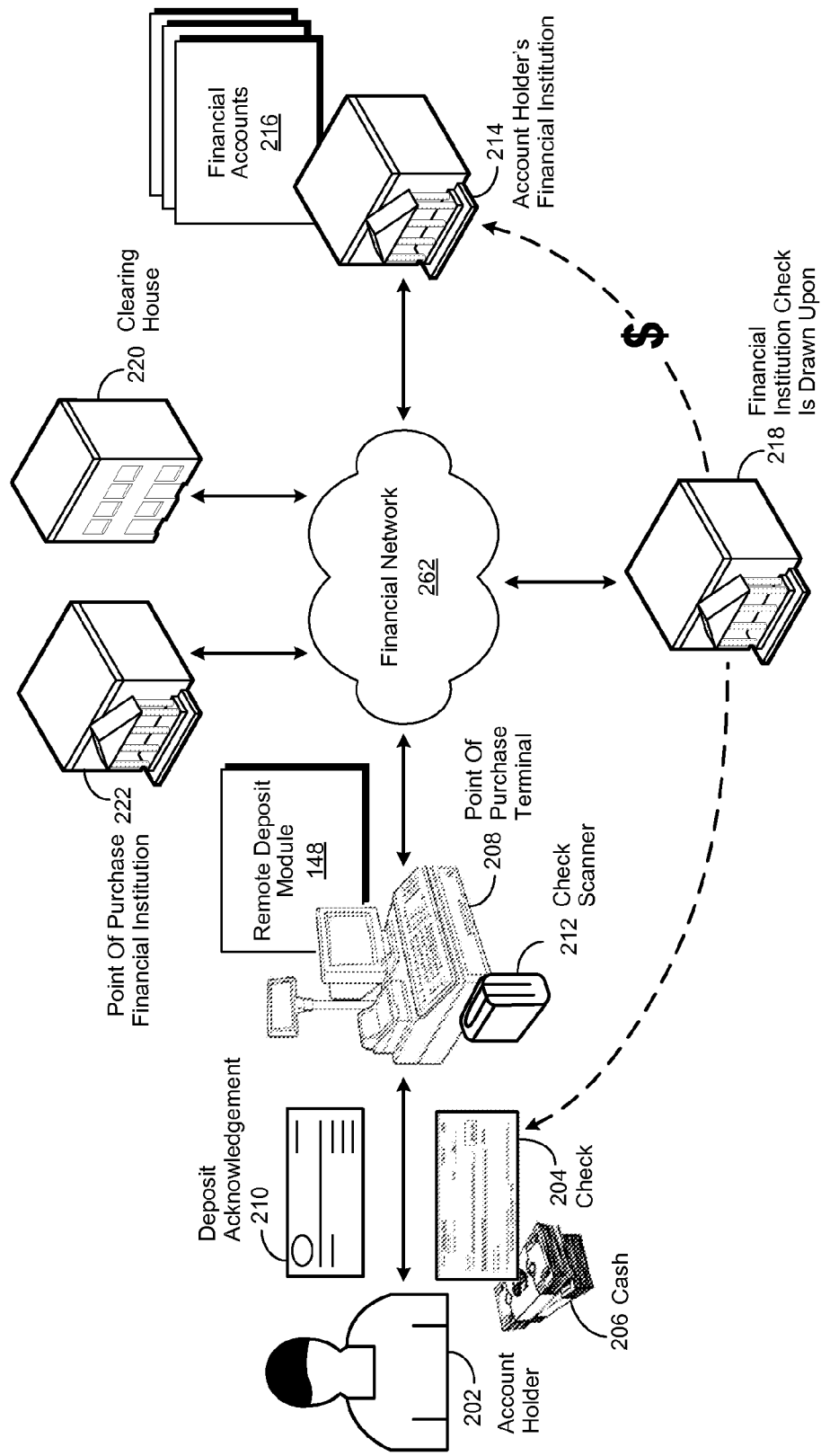
FIG. 2 is a simplified block diagram of a remote deposit system as implemented in accordance with an embodiment of the invention.
Figure 3A:
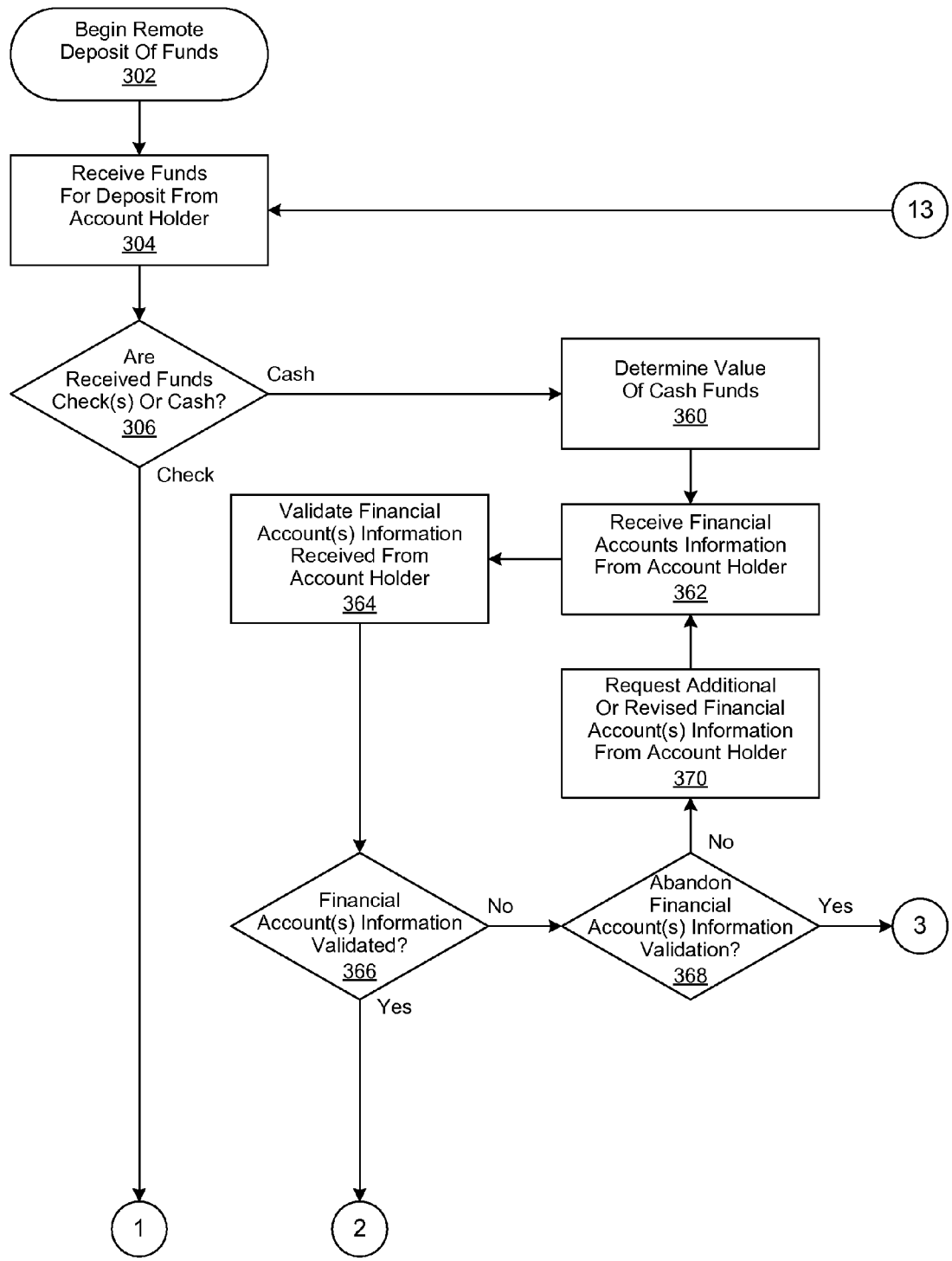
FIGS. 3a-e are a generalized flowchart of the operation of a remote deposit system as implemented in accordance with an embodiment of the invention.
Figure 3B:
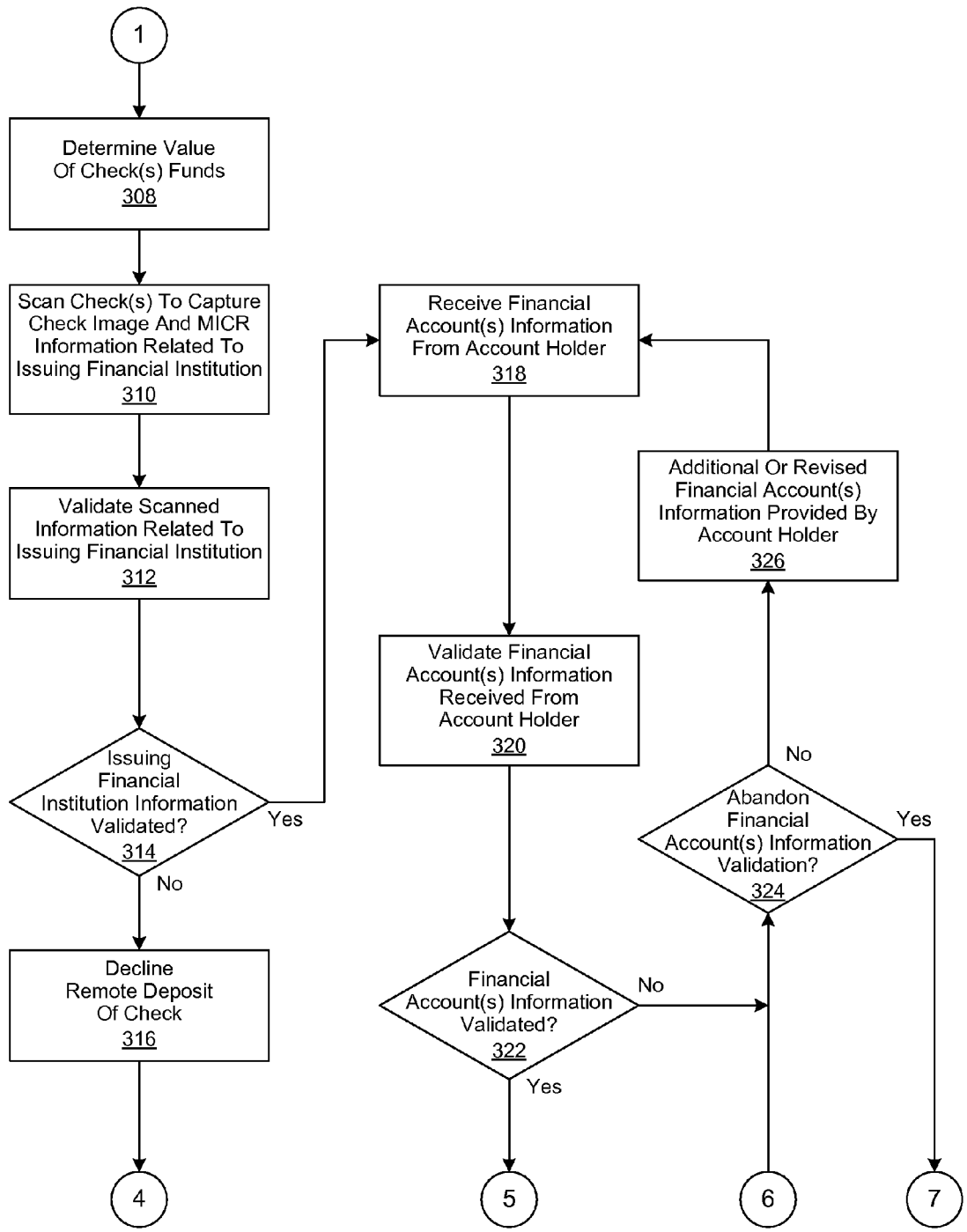
Figure 3C:
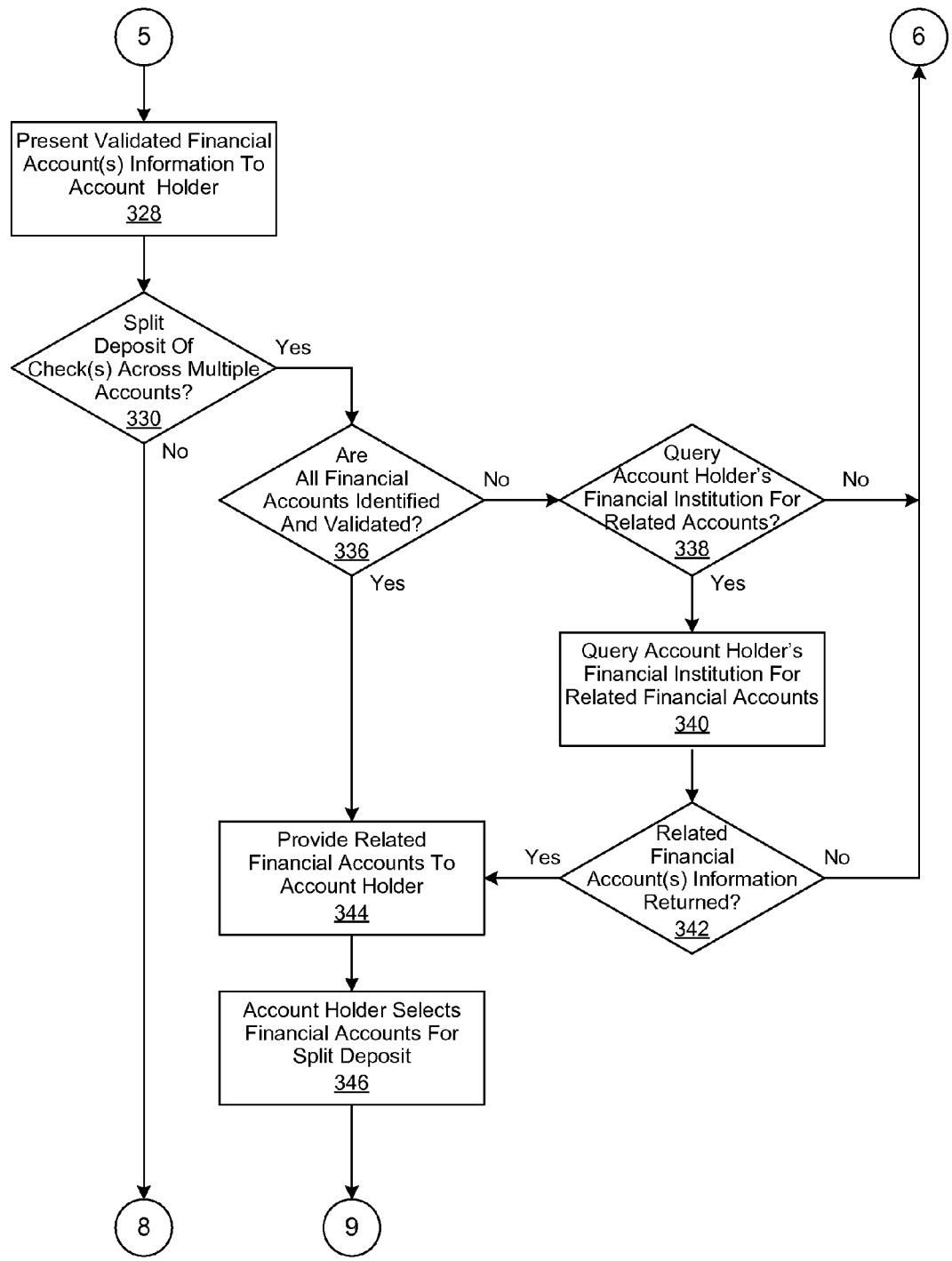
Figure 3D:
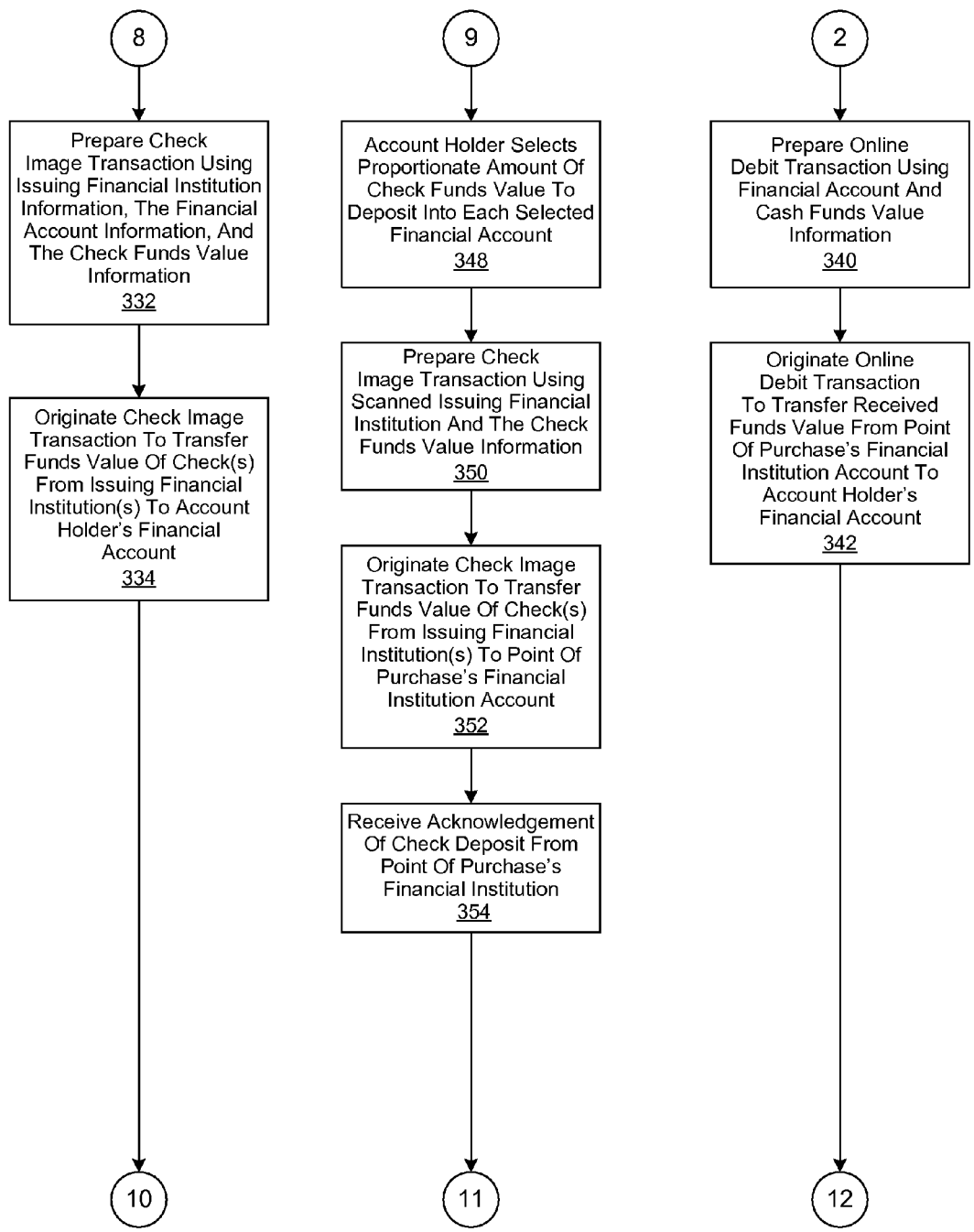
Figure 3E:
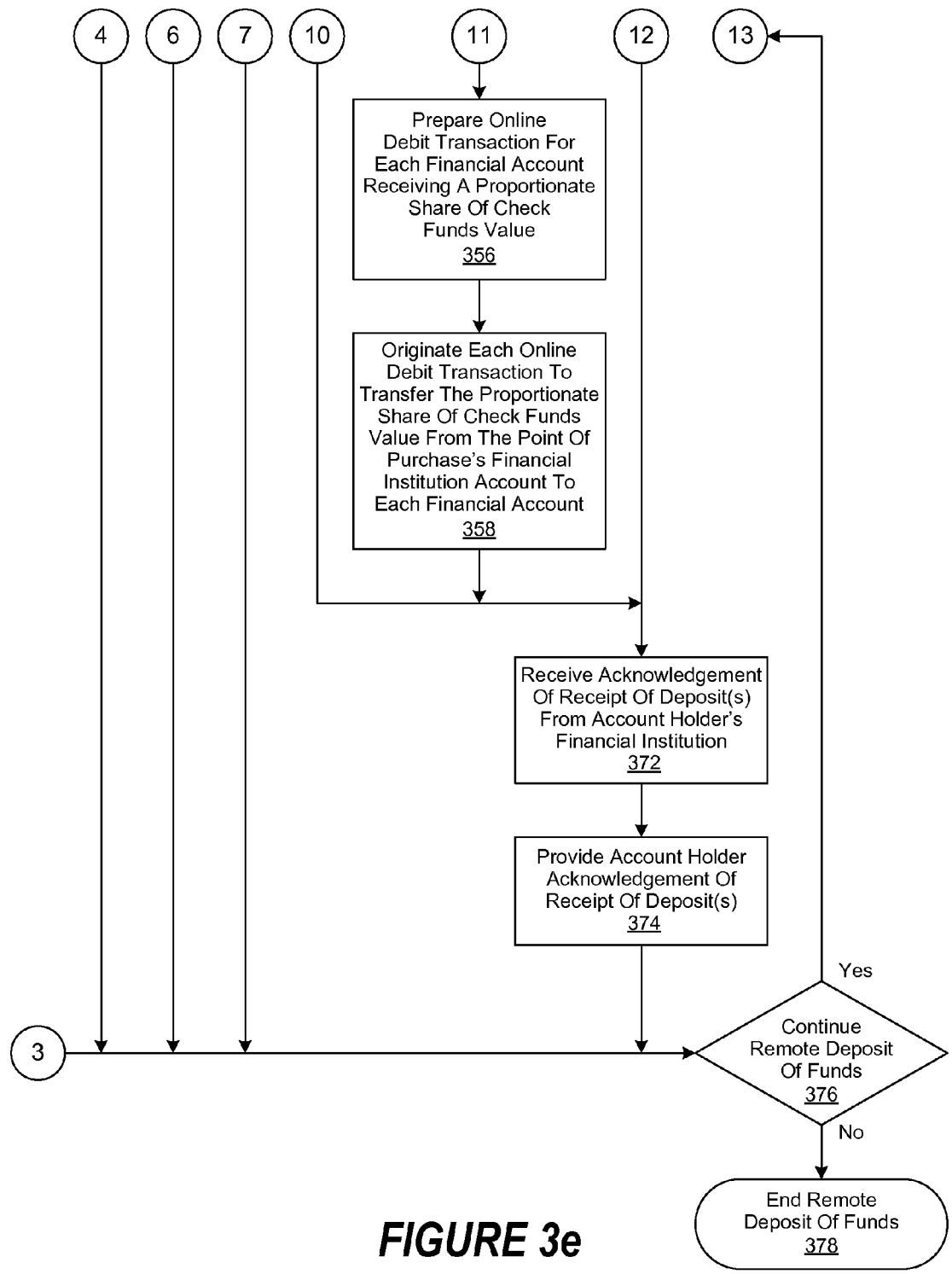

FIG. 2 is a simplified block diagram of a remote deposit system as implemented in accordance with an embodiment of the invention. In various embodiments, funds such as cash 206 and check 204 are received from an account holder 204 for remote deposit from a point of purchase (POP) terminal 208 into one or more financial accounts 216 associated with account holder 204. As used herein, a POP terminal 208 refers to any combination of computing and communications functionality operable to process a financial transaction over a network (e.g., financial network 262) connection with a remote financial institution. In various embodiments, these remote financial institutions include the account holder's financial institution 214, the financial institution a check is drawn upon 218, and a financial institution associated with POP terminal 208. In one embodiment, a transaction for the deposit of funds is processed by a clearinghouse 220. In another embodiment, origination of a deposit transaction results in the funds being transferred directly from a financial account of a first financial institution (e.g., the financial institution a check is drawn upon 218) into a financial account of a second financial institution (e.g., the account holder's financial institution 214). As used herein, a financial account is defined as an account issued by a financial institution to hold funds for an account holder. In various embodiments, a financial account may comprise a checking account, a savings account, a money market account, an investment account, a mutual funds account, a 401K account, or a 529 account.

In various embodiments the POP terminal 208 comprises a remote deposit module 148 operable to process transactions with a plurality of financial institutions (e.g., 214, 218, 222) and clearinghouses such as clearinghouse 220. In one embodiment, checks 204 are scanned by check scanner 212 to capture information relating to the issuing financial institution, such as the financial institution bank identification number (BIN), routing information, branch identification, and the financial account the check is drawn upon. In one embodiment, the check scanner 212 comprises optical scanning capabilities and both the front and the back of the check 204 are optically scanned to generate a digitized image. In another embodiment, the scanned image is processed to determine the monetary value of the check(s), financial information related to the financial institution that issued or backs the check 204, and other information, such as the payee. In yet another embodiment, check scanner 212 comprises a magnetic ink reader operable to read and decode magnetic ink character recognition (MICR) data that is imprinted on the check. In one embodiment, the scanned information relating to the financial institution that issued or backs check 204 is validated.

In one embodiment, a check image transaction is originated by the POP terminal 208 to deposit the funds value of check 204 into one of the account holder's 202 financial accounts 216. In another embodiment, multiple checks drawn on different issuing financial institutions are deposited in a single financial account 216. In yet another embodiment, the deposit of the funds value of the check 204 is split across multiple financial accounts 216. In one embodiment, a check image transaction is originated to deposit the funds value of check(s) 204 into an account of the point of purchase financial institution. One or more debit transactions are then originated to transfer proportionate amounts of the funds value of check(s) 204 into multiple financial accounts 216. In another embodiment, the cash funds 206 are received and a debit transaction is originated to transfer the funds value of the cash 206 from an account of a financial institution associated with the POP terminal 222 into a financial account 216 associated with the account holder 202. In these and other embodiments, the POP terminal 208 receives acknowledgment of the receipt of the deposits from the account holder's financial institution 214. The account holder 202 is then provided acknowledgement 210 of the receipt of the deposits into the account holder's financial account(s) 216.

FIGS. 3a-e are a generalized flowchart of the operation of a remote deposit system as implemented in accordance with an embodiment of the invention. In this embodiment, the remote deposit of funds into a financial account from a point of purchase (POP) terminal is begun in block 302. As used herein, a POP terminal refers to any combination of computing and communications functionality operable to process a financial transaction over a network connection with a remote financial institution. In various embodiments, the POP terminal is operable to communicate with a plurality of financial institutions, using a connection to a proprietary financial network, to originate a transaction for the transfer of funds from a first financial institution to a second financial institution. In one embodiment, the transaction for the transfer of funds is processed by a clearinghouse. In another embodiment, origination of the transaction results in the funds being transferred directly from a first financial institution to a second institution.

Funds are received from an account holder in block 304 for remote deposit from the POP terminal into one or more financial accounts associated with the account holder. As used herein, a financial account is defined as an account issued by a financial institution to hold funds for an account holder. In general, a financial account is subject to increases of financial value through deposits and decreases through withdrawals. In various embodiments, a financial account may comprise a checking account, a savings account, a money market account, an investment account, a mutual funds account, a 401K account, or a 529 account. Those of skill in the art will be aware that there are many kinds of financial accounts and the foregoing are offered as examples only and are not intended to constrain the spirit or intent of the disclosure.

A determination is made in block 306 whether the funds received from the account holder for remote deposit are in the form of one or more checks or cash. If it is determined in block 306 that the received funds are in the form of checks, then the value of the check funds are determined in block 308. The checks are then scanned in block 310 to capture information relating to the issuing financial institution, such as the financial institution bank identification number (BIN), routing information, branch identification, and the financial account the check is drawn upon. In various embodiments the POP terminal comprises a check scanner. In one embodiment, the check scanner comprises optical scanning capabilities and both the front and the back of the check are optically scanned to generate a digitized image. In one embodiment, optical character recognition (OCR) processes are implemented to convert the scanned image to machine readable code. In another embodiment, the scanned image is processed to determine the monetary value of the check(s), financial information related to the financial institution that issued or backs the check, and other information, such as the payee. In yet another embodiment, the check scanner comprises a magnetic ink reader operable to read and decode magnetic ink character recognition (MICR) data that is imprinted on the check. The decoded MICR data is likewise processed to determine the monetary value of the check(s), financial information related to the financial institution that issued or backs the check, and other information, such as the payee.

The scanned information relating to the financial institution that issued or backs the check(s) is then validated in block 312. As an example, the BIN and routing information may be checked against a database of valid financial institutions and their associated information. As another example, the POP terminal may process a validation transaction with a financial institution over a proprietary financial network to verify the validity of the financial institution. If it is determined in block 314 that the scanned information relating to the issuing financial institution cannot be validated, then remote deposit of the received check funds is declined in block 316. A determination is then made in block 376 whether to continue the remote deposit of funds. If so, the process is continued, proceeding with block 304. Otherwise, the remote deposit of funds is ended in block 378.

However, if it is determined in block 314 that the scanned information relating to the issuing financial institution is valid, then information relating to one or more financial accounts associated with the account holder are received in block 318. As an example, the account holder may provide a deposit slip associated with one of their financial accounts. As another example, the account holder may provide a debit or credit card that issued to the account holder and is associated with one of their financial accounts. The provided financial account(s) information is then used in block 320, as described in greater detail herein, to validate the account holder's financial account information. A determination is then made in block 322 whether the provided financial account information is valid. If not, then a determination is made in block 324 whether to abandon the validation of the provided financial account information. If so, then a determination is then made in block 376 whether to continue the remote deposit of funds. If so, the process is continued, proceeding with block 304. Otherwise, the remote deposit of funds is ended in block 378. However, if it is determined in block 324 not to abandon the validation of the account holder's associated financial account(s), then additional or revised financial account(s) information is provided by the account holder in block 326. The process then continues, proceeding with block 318. However, if it is determined that the financial account information was successfully validated in block 322, then the validated financial account(s) information is provided to the account holder in block 328.

A determination is then made in block 330 whether to split the deposit of the funds value of the check(s) across multiple financial accounts. As an example, the account holder may have a check for the amount of $500.00. They may desire to deposit $400.00 into their checking account and $100.00 into their savings account. Conversely, the account holder may have three checks, one for $400.00, one for $125.00, and another for 280.00, each drawn on a different issuing financial institution. They may decide that they want all three checks, with a total value of $805.00, deposited into their checking account and none of the check's monetary value deposited into their savings account.

If it is determined in block 330 that value of the check funds is to be deposited in a single financial account, then a check image transaction is prepared in block 332, using the issuing financial institution information, the account holder's financial account information, and the check funds value information. In one embodiment, the check image transaction is a Check 21 transaction. Those of skill in the art will be familiar with Check 21 transactions, which allow the recipient of a paper check to create a digital version of the check from a captured check image, and then deposit the digital check electronically, a process commonly known as remote deposit. This process of removing the paper element from the traditional flow of processing checks is known as truncation. Once a check has been truncated, its images can be between financial institutions, clearinghouses, and the Federal Reserve Bank.

Skilled practitioners of the art will likewise be aware that remote deposit allows depositing customers the ability to upload Check 21-based images to their financial institution to deposit checks into their accounts. Therefore, it will be appreciated that while remote deposit may preclude the need for merchants and other large depositors to travel to their financial institution to make physical deposit, not all consumers have access to check scanning equipment.

Once prepared, the POP terminal originates the check image transaction in block 334 to transfer the respective funds value of each check from its issuing financial institution to the designated account holder's financial account. However, if it is determined in block 330 the check deposit will be split across multiple accounts, then a determination in block 336 whether all of the financial accounts involved in the deposit of the check funds have been identified and validated. For example, the account holder may have provided financial account information associated with their checking account, but not their savings account, and then decides to do have a split deposit of the check funds.

If it is determined in block 336 that not all of the required financial account information has been provided and validated, then a determination is made in block 338 whether the POP terminal will query the account holder's financial institution for related financial accounts information. If not, then the process continues, proceeding with block 324. Otherwise, the POP terminal queries the account holder's financial institution in block 340 for related financial account information. A determination is then made in block 342 whether the query returned related financial account information. If not, then the process continues, proceeding with 324. Otherwise, the related financial account information is provided to the account holder in block 344. The account holder then selects the financial accounts that will receive the split deposit of the value of the check funds in check 346. Once the receiving financial accounts have been selected in block 348, the account holder selects a proportionate share of the value of the check funds in block 348 to be deposited in each of the selected financial accounts.

A check image transaction is then prepared in block 350 using the scanned issuing financial institution information and the check funds value information. The check image transaction is then originated by the POP terminal in block 352 to transfer the value of the check funds into an account at a financial institution associated with the POP terminal. Once the check image transaction with the POP terminal's financial institution is completed, an acknowledgement of the receipt of the deposit is received by the POP terminal. An online debit transaction is then prepared in block 356 for each of the selected financial accounts associated with the account holder that will receive a proportionate share of the value of the check funds. Each of the online debit transactions are then originated in block 358 to transfer the proportionate share of the value of the check funds to their respective financial account associated with the share holder.

However, if it is determined in block 306 that the received funds are cash funds, then the value of the cash funds are determined in block 360. Information relating to one or more financial accounts associated with the account holder is then received in block 362 as described in greater detail herein. The provided financial account(s) information is then used in block 364, as described in greater detail herein, to validate the account holder's financial account information. A determination is then made in block 366 whether the provided financial account information is valid. If not, then a determination is made in block 368 whether to abandon the validation of the provided financial account information. If so, then a determination is then made in block 376 whether to continue the remote deposit of funds. If so, the process is continued, proceeding with block 304. Otherwise, the remote deposit of funds is ended in block 378. However, if it is determined in block 368 not to abandon the validation of the account holder's associated financial account(s), then additional or revised financial accounts information is provided by the account holder in block 362. The process then continues, proceeding with block 364. However, if it is determined that the financial account information was successfully validated in block 366 then an online debit transaction is then prepared in block 340 for the value of the cash funds. The online debit transaction is then originated in block 342 to transfer the value of the check cash funds to the financial account associated with the share holder.

Once the value of the check or cash funds have been respectively deposited to one or more financial accounts associated with the account holder in blocks 334, 358, or 342, the POP terminal receive acknowledgment of the receipt of the deposits from the account holder's financial institution in block 372. The account holder is then provided acknowledgement of the receipt of the deposits into the account holder's financial account(s) in block 374. A determination is then made in block 376 whether to continue the remote deposit of funds. If so, the process is continued, proceeding with block 304. Otherwise, the remote deposit of funds is ended in block 378.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A system for managing a financial transaction, comprising:
   a deposit processing module operable to:
      receive a check from a customer for deposit to a financial institution of said customer; and
      generate deposit transaction processing data based on said check; and
   a point of purchase (POP) terminal operated by a merchant at a retail location operable to:
      communicate with said customer financial institution over a communications network;
      receive, from the customer financial institution, a list of available accounts associated with the customer;
      receive, from the customer, a selection of one or more deposit accounts selected from the list of available accounts;
      validate an issuing financial institution of said check based on said transaction processing data; and
      use said deposit transaction processing data to initiate a deposit transaction with said customer financial institution to deposit funds in the one or more deposit accounts at said customer financial institution if said issuing financial institution is validated.

2. The system of claim 1, wherein said POP terminal is further operable to provide said deposit transaction data to a financial clearinghouse, wherein said clearinghouse uses said deposit transaction data to deposit said funds in said one or more deposit accounts at said customer financial institution.

3. The system of claim 1, wherein:
   the one or more deposit accounts are two or more deposit accounts; and
   said funds are deposited in the two or more deposit accounts in a proportionate share of a value of said funds, wherein said proportionate share is calculated using input data from said customer.

4. The system of claim 1, wherein said POP terminal comprises an image scanner operable to generate an electronic image of said check and wherein said deposit processing module executes an optical character recognition process to obtain a portion of said deposit transaction processing data from said electronic image.

5. The system of claim 1, wherein said POP terminal comprises a magnetic ink reader operable to read magnetic ink characters on said check to generate a portion of said deposit transaction processing data.

6. The system of claim 1, wherein validating said issuing financial institution comprises successfully processing a validation transaction with said issuing financial institution.

7. The system of claim 1, wherein said POP terminal is further operable to:
   recognize a cash deposit from said customer; and
   initiate a transfer of funds value of the cash deposit from an account associated with said POP terminal into the one or more deposit accounts.

8. The system of claim 1, wherein to initiate the deposit transaction to deposit the funds includes to:
   deposit the funds into an account at a financial institution associated with the POP terminal; and
   perform a funds transfer from the POP terminal financial institution to the one or more deposit accounts at said customer financial institution after receiving acknowledgement of the deposit to the POP terminal financial institution.

9. A computer-implementable method for managing a financial transaction, comprising:
   using a deposit processing module to:
      receive a check from a customer for deposit to a financial institution of said customer; and
      generate deposit transaction processing data based on said check; and
   using a point of purchase (POP) terminal operated by a merchant at a retail location to:
      communicate with said customer financial institution over a communications network;
      receive, from the customer financial institution, a list of available accounts associated the customer;
      receive, from the customer, a selection of one or more deposit accounts selected from the list of available accounts;
      validate an issuing financial institution of said check based on said transaction processing data; and
      use said deposit transaction processing data to initiate a deposit transaction with said customer financial institution to deposit funds in the one or more deposit accounts at said customer financial institution if said issuing financial institution is validated.

10. The computer-implementable method of claim 9, wherein said POP terminal is further operable to provide said deposit transaction data to a financial clearinghouse, wherein said clearinghouse uses said deposit transaction data to deposit said funds in said one or more deposit accounts at said customer financial institution.

11. The computer-implementable method of claim 9, wherein:
the one or more deposit accounts are two or more deposit accounts; and
said funds are deposited in the two or more deposit accounts in a proportionate share of a value of said funds, wherein said proportionate share is calculated using input data from said customer.

12. The computer-implementable method of claim 9, wherein said POP terminal comprises an image scanner operable to generate an electronic image of said check and wherein said deposit processing module executes an optical character recognition process to obtain a portion of said deposit transaction processing data from said electronic image.

13. The computer-implementable method of claim 9, wherein said POP terminal comprises a magnetic ink reader operable to read magnetic ink characters on said check to generate a portion of said deposit transaction processing data.

14. The computer-implementable method of claim 9, wherein validating said issuing financial institution comprises successfully processing a validation transaction with said issuing financial institution.

15. The computer-implementable method of claim 9, wherein the POP terminal is further used to:
recognize a cash deposit from said customer at said POP terminal; and
initiate a transfer of funds value of the cash deposit from an account associated with said POP terminal into the one or more deposit accounts.

16. The computer-implementable method of claim 9, wherein to initiate the deposit transaction to deposit the funds includes to:
deposit the funds into an account at a financial institution associated with the POP terminal; and
perform a funds transfer from the POP terminal financial institution to the one or more deposit accounts at said customer financial institution after receiving acknowledgement of the deposit to the POP terminal financial institution.

17. A non-transitory computer-readable storage medium embodying computer program code, the computer program code comprising non-transitory computer executable instructions that cause a computer to perform a method including:
using a deposit processing module to:
receive a check from a customer for deposit to a financial institution of said customer; and
generate deposit transaction processing data based on said check; and
using a point of purchase (POP) terminal operated by a merchant at a retail location to:
communicate with said customer financial institution over a communications network;
receive, from the customer financial institution, a list of available accounts associated with the customer;
receive, from the customer, a selection of one or more deposit accounts selected from the list of available accounts;
validate an issuing financial institution of said check based on said transaction processing data; and
use said deposit transaction processing data to initiate a deposit transaction with said customer financial institution to deposit funds in the one or more deposit accounts at said customer financial institution if said issuing financial institution is validated.

18. The computer-readable storage medium of claim 17, wherein said POP terminal provides said deposit transaction data to a financial clearinghouse, and wherein said clearinghouse uses said deposit transaction data to deposit said funds in said one or more deposit accounts at said customer financial institution.

19. The computer-readable storage medium of claim 17, wherein:
the one or more deposit accounts are two or more deposit accounts; and
said funds are deposited in said two or more deposit accounts in a proportionate share of a value of said funds, wherein said proportionate share is calculated using input data from said customer.

20. The computer-readable storage medium of claim 17, wherein said POP terminal comprises an image scanner operable to generate an electronic image of said check and wherein said deposit processing module executes an optical character recognition process to obtain a portion of said deposit transaction processing data from said electronic image.

21. The computer-readable storage medium of claim 17, wherein said POP terminal comprises a magnetic ink reader operable to read magnetic ink characters on said check to generate a portion of said deposit transaction processing data.

22. The computer-readable storage medium of claim 17, further comprising instructions for validating said issuing financial institution by successfully processing a validation transaction with said issuing financial institution.

23. The computer-readable storage medium of claim 17, wherein to initiate the deposit transaction to deposit the funds includes to:
deposit the funds into an account at a financial institution associated with the POP terminal; and
perform a funds transfer from the POP terminal financial institution to the one or more deposit accounts at said customer financial institution after receiving acknowledgement of the deposit to the POP terminal financial institution.

* * * * *